United States Patent [19]

Hanushewsky

[11] 3,876,501

[45] Apr. 8, 1975

[54] BINDING ENZYMES TO ACTIVATED WATER-SOLUBLE CARBOHYDRATES
[75] Inventor: Michael Hanushewsky, Cicero, Ill.
[73] Assignee: Baxter Laboratories, Inc., Morton Grove, Ill.
[22] Filed: May 17, 1973
[21] Appl. No.: 361,119

[52] U.S. Cl............. 195/68; 195/63; 195/DIG. 11; 260/112 R; 260/209 R
[51] Int. Cl............................................. C07g 7/02
[58] Field of Search................ 195/63, 68, DIG. 11; 260/209 R, 209 D, 210, 210 D, 112

[56] References Cited
UNITED STATES PATENTS
3,645,852  2/1972  Axen et al.................. 195/DIG. 11

3,788,948  1/1974  Kagedal et al....................... 195/68

OTHER PUBLICATIONS

Axen et al., Bonding of Proteins to Polysaccharides by Means of Cyanogen Halides. Acta Chem. Scand. Vol. 25, No. 7, 1971 (pp. 2711–2716).

*Primary Examiner*—David M. Naff
*Attorney, Agent, or Firm*—Garrettson Ellis

[57] ABSTRACT

Water-soluble carbohydrates can be activated by means of cyanogen bromide in a nonaqueous medium to exhibit an improved level of binding reactivity toward enzymes and other proteins, while preventing cross-linking and consequent water-insolubility in the carbohydrates.

15 Claims, No Drawings

3,876,501

BINDING ENZYMES TO ACTIVATED WATER-SOLUBLE CARBOHYDRATES

BACKGROUND OF THE INVENTION

In U.S. Pat. No. 3,639,213, and elsewhere, it has been suggested that various enzymes can be usefully bonded to a water-soluble matrix consisting of carbohydrate molecules or the like. It has been determined that an enzyme or other protein can be stabilized in this manner, and that the matricized product can be used in various ways. For example, some preparations can be injected as a drug into a subject, thus obtaining a reduced antibody reaction against the enzyme or other protein, due to the fact that the enzyme is chemically bonded to the relatively biologically inert carbohydrate.

In U.S. Pat. No. 3,645,852, it has been suggested to react polysaccharides such as cellulose, or dextran copolymers, with cyanogen halides in an aqueous medium to activate the material for reaction with an enzyme or other protein.

Water-soluble carbohydrates such as dextran can be activated by the methods taught in U.S. Pat. No. 3,645,852 to react with enzymes and the like. However, during the activation reaction, portions of the dextran reactants tend to become water insoluble, presumably by a cross-linking side reaction. This, of course, is a substantial negative factor when one seeks to produce water-soluble matricized enzymes.

In accordance with this invention, a technique for producing high yields of water-soluble, matricized enzymes, which can be essentially free of water-insoluble by-products, is disclosed. Furthermore, the method of this invention can provide water-soluble matricized enzyme products having a substantially increased enzyme activity per milligram when compared with the prior art aqueous techniques of activation with cyanogen halides.

DESCRIPTION OF THE INVENTION

In accordance with this invention, a method of activating a water-soluble carbohydrate for chemical binding with a protein is provided which comprises: combining the carbohydrate with a cyanogen halide in the presence of a nonreactive, nonaqueous solvent such as a lower alcohol of no more than about 3 carbon atoms, in the presence of an alkali of the formula MOR in a concentration sufficient to provide a pH of at least 10 if the same concentration of alkali were added to deionized water, in which M is an alkali metal and R is a lower alkyl radical or hydrogen. The reaction should take place for a period of time sufficient to permit complete activation, which is relatively rapid. A period of time ranging from 10 to 40 minutes is usually sufficient to permit the activation reaction to go to completion.

The cyanogen halide used herein is typically cyanogen bromide, but other cyanogen halides such as cyanogen iodide or cyanogen chloride can be used. The general quantity of cyanogen halide used appears not to be especially critical, it being preferred to use from 0.5 to 1.5 parts by weight of cyanogen halide per one part of weight of carbohydrate present in the reaction mixture.

The nonreactive nonaqueous solvent used is most preferably absolute, i.e., essentially free of water as an impurity. The presence of water appears to promote undesirable side reactions which cause the insolubilization of the water-soluble carbohydrate and a reduction in the yield or activity of the product of the reaction. The nonaqueous solvent should be capable of dissolving a substantial amount of the cyanogen halide and the alkali used, and should be chemically nonreactive to these materials under the reaction conditions used. Lower alcohols such as methanol, ethanol, isopropanol, n-butanol, ethane-diol, or propane-diol can be used. However, the dissolving of the ingredients in glycols or higher alcohols is often difficult, and undesirable reactions have been observed to take place with branched alcohols such as isobutanol, so the lowest molecular weight alcohols such as methanol are preferred. It is also generally preferred to use in the reaction mixture about 20 to 80 ml. of the nonaqueous solvent per gram of carbohydrate present.

The alkali having the formula MOR can be an alkali metal alkoxide or hydroxide such as sodium methoxide, potassium ethoxide, potassium butoxide, lithium hydroxide, or sodium hydroxide. Equivalent rubidium and cesium compounds can also be used. It is generally preferred to use the alkoxide compounds (i.e., where R is lower alkyl), since alkali metal hydroxides have a strong tendency to retain absorbed water, and thus may tend to promote side reactions unless they have been carefully dried prior to use. Also, alkali metal alkoxides can have better solubility in the solvents used herein. The alkali material of the formula MOR is added to the reaction mixture in such a concentration that, if the reaction mixture were deionized water, the alkali concentration would be sufficient to provide a pH of at least 10 to the mixture. Of course, in a nonaqueous system it is generally improper to consider a pH as being present, but the alkali material is present to provide non-aqueous alkaline conditions.

It is particularly desirable to provide a concentration of alkali sufficient to give deionized water a pH of 11 or higher. Also, it may be necessary to add alkali in the first few minutes of reaction, if small amounts of alkali are initially added, since alkali is apparently consumed during the reaction.

A description of the apparent mechanism of cyanogen bromide activation of carbohydrate in an aqueous system can be found in "A Study of the Mechanism of Cyanogen Bromide Activation of Cellulose", pages 1039 to 1044, *Biotechnology and Bioengineering*, Vol. XIV (1972).

It is at the present time unknown whether the reaction mechanism of the nonaqueous system of this invention is similar to or different from the mechanism as described in the publication cited immediately above.

The carbohydrates used herein can be dextran, soluble starch, soluble glycogen, or the like, and generally should have a molecular weight of at least about 5,000. It is most preferable to use materials such as dextran of a molecular weight of about 40,000 to 100,000, particularly Dextran 70 (molecular weight 70,000), which is a nontoxic drug already used in various forms of therapy. However, soluble dextrans having molecular weights of 500,000 and above can be used.

It is typically preferred to provide to the reaction mixture from 1 to 3 parts by weight of sodium methoxide, 1 to 3 parts by weight of dextran, and 1 to 3 parts by weight of cyanogen bromide per 100 parts by weight of methanol solvent.

The reaction of this invention proceeds at room temperature, but it is preferred to maintain a reduced reaction temperature, typically from minus 20° to plus 10°C.

After reaction has gone to completion, the resulting activated carbohydrate which under the preferred reaction conditions is insoluble in the nonaqueous solvent can be recovered by simple filtration, followed by washing with a nonaqueous solvent, and vacuum drying to remove solvent.

The dried, activated carbohydrate, generally from about one to 300 parts by weight, can then be dissolved in an appropriate aqueous buffer such as 0.1 M sodium bicarbonate solution, to keep the pH generally between about 5 and 9, and mixed with a solution or dispersion of about one part by weight of enzyme or other protein at reduced temperature, typically 0° to about 5°C. for a number of hours or days. The reaction product of the carbohydrate and protein can be isolated from free protein by column chromatography, or by other techniques such as selective precipitation using mixtures of alcohol and water.

Typically from about 10 to 80 parts by weight of activated carbohydrate, and preferably from about 15 to 40 parts by weight, are reacted with one part by weight of protein.

Unique and medically interesting materials have been made by reacting the activated carbohydrate made in accordance with this invention with streptokinase. Such soluble reacted material, which has been animal tested, exhibits superior therapeutic advantage over the respective free enzyme. Reduced antibody formation has been noted upon administration of the matricized streptokinase produced in accordance with this invention, even when compared with the administration of greater dosages of free streptokinase.

The product of this invention can be used to bond many different large molecules, typically having a molecular weight of over 1,000. The large molecules are generally proteins, although other biological materials such as heparin can be bonded.

Typical proteins which can be utilized to react with the activated carbohydrates produced in accordance with this invention are generally enzymes, although antibodies, hormones, and the like can also be bonded. Also proteins which contain certain nonprotein substituents, such as metal ions, polysaccharides, porphyrin groups, adenine dinucleotide, ribonucleic acid, phospholipids, and the like can be bonded in accordance with this invention. Such materials are considered to fall within the definition of "protein" for the purposes of this invention, since they contain major polypeptide or protein substituents, and since they can be chemically bonded to carbohydrate support media of the type described above. Protein polypeptide fragments can also be bonded in accordance with this invention, such as active portions of enzyme molecules.

Examples of the protein-containing materials which may be chemically bonded in this invention are enzymes such as phosphopyruvic transphosphorylase, transmethylase, amine oxidase, glutamicoxalacetic transaminase, glutamic-pyruvic transaminase, lipoxidase, peroxidase, catalase, glucose oxidase, urease, glutaminase, urokinase, arginase, phosphatase, lecithinase, cholinesterase, lipase, histidase, pectinase, maltase, alpha amylase, amyloglucosidase, keratinase, bromelin, chymotrypsin, trypsin, pepsin, ficin, papain, and chymopapain. Other suitable enzymes include the rennin-like proteases produced by the organisms *Mucor miehei* and *Mucor pusillus*, useful in the preparation of cheese; alkaline protease enzymes such as produced by the organism *Bacillus subtilis*, variety *licheniformis*; amylase enzymes such as that produced by *Bacillus amyloliquefaciens*; and the enzymes L-asparaginase or serine dehydratase, which may have utility against certain types of tumor cells by depriving them of asparagine or serine, an essential amino acid for such tumor cells.

Other protein materials which can be bonded to the activated carbohydrates made according to this invention include hormones such as insulin and the various pituitary hormones; proteins of the gamma globulin fraction, e.g., antibodies of the classes G, M, A, D, and E; and other blood factors such as the antihemophilic factor; the blood clotting factors; specific antibodies such as hepatitis, influenza, poliomyelitis, measles, mumps, and rabies antibodies; appropriate antigens such as dust, ragweed, or mold antigen; or hepatitis, poliomyelitis, measles, mumps, influenza or rabies antigen for purification or for experimental supression of antibody reactions; and general body proteins such as hemoglobin or albumin.

The following examples are offered for illustrative purposes only, and are not intended to limit the scope of the invention of this application, which is defined in the claims below.

EXAMPLE 1

One gram of sodium methoxide was added to 50 milliliters of absolute methanol. To this solution there was added 1 gram of cyanogen bromide, followed by 1 gram of Dextran 70 (molecular weight of 70,000) which did not dissolve in the alcohol mixture. The reaction mixture was stirred for 20 minutes at room temperature. The resulting solid product was recovered by simple filtration, followed by washing with absolute methanol and air drying.

Five hundred milligrams of the resulting activated product were dialyzed by dissolving it in 5 ml. of 0.1 M sodium bicarbonate aqueous buffer solution. Simultaneously, 19.6 mg. of streptokinase were dissolved in 3 ml. of 0.1 M sodium bicarbonate solution. Both solution samples were dialyzed at 4°C. for 2 to 3 hours against 0.1 M sodium bicarbonate solution.

The two dialyzed solutions were combined, and 2 ml. of 0.1 M sodium bicarbonate solution added to make a total volume of 10 ml. The reaction mixture was stirred at room temperature for one hour, and then allowed to stand for 41 hours at 4°C.

The soluble bound product was isolated by column chromatography. Porous glass microbeads (Corning CPG beads, sold by the Corning Glass Company of Corning, New York) can be used as a suitable separating column medium. The fractions containing dextran-streptokinase were lyophilized to give a fluffy white solid with an enzyme activity of 748 streptokinase activity units per milligram.

EXAMPLE 2

To 50 ml. of absolute methanol was added 4 ml. of a 25% solution of sodium methoxide in methanol. The beaker containing this mixture was packed in dry ice to cool it in an anhydrous manner, and thereafter one gram of cyanogen bromide was added, followed by one gram of Dextran 70 (molecular weight 70,000). The reaction mixture was stirred for 20 minutes, at the reduced temperature of about 0° to −10°C. imparted by the dry ice. The product, a white solid, was recovered by filtration, followed by washing with methanol and drying for 1 hour in a vacuum in a container containing a drying agent (calcium chloride) separate from the activated dextran sample.

The above reaction was repeated several times, as needed, to provide sufficient activated dextran for the binding reactions described below.

Portions of the activated dextran prepared above and samples of streptokinase enzyme were added to separate portions of 0.1 M sodium bicarbonate aqueous buffer, and thereafter combined with stirring at a temperature of about 4°C., to provide a reaction sample having a solution volume as indicated in the table below, and concentrations of dextran and streptokinase as similarly indicated below. The weights of streptokinase present were calculated from a streptokinase activity of 80,000 streptokinase units per milligram of enzyme added. The reaction mixtures were maintained at 4°C. for the number of hours indicated below.

After the reaction time, the dextran-streptokinase was isolated by column chromotography through a glass bead column, and the fractions containing the bound enzyme were lyophilized to give a solid product having the number of streptokinase units per milligram as indicated. The maximum theoretical yield of streptokinase units per milligram is also indicated, as is the percent of nitrogen found by analysis of some products.

That which is claimed is:

1. A method of activiting a water-soluble carbohydrate and chemically binding it with enzyme molecules, which comprises: combining said carbohydrate with a cyanogen halide in the presence of a lower alcohol essentially free of water selected from the group consisting of methanol, ethanol, propanol and butanol, and in the presence of a dissolved alkali of the formula MOR in a concentration sufficient to provide a pH of at least 10 if the same alkali concentration were added to deionized water, in which M is an alkali metal and R is selected from the group consisting of methyl, ethyl, propyl and butyl radicals for a period of time sufficient to permit said activation of the carbohydrate, and after said period of time bringing from 1 to 300 parts by weight of said activated carbohydrate into contact with one part by weight of an enzyme for reaction therebetween.

2. The method of claim 1 in which said activated carbohydrate is in aqueous solution while in contact with said enzyme.

3. The method of claim 2 in which said carbohydrate has a molecular weight of at least 5,000.

4. The method of claim 3 in which said carbohydrate is dextran.

5. The method of claim 4 in which said solvent is an absolute alcohol of no more than three carbon atoms and one hydroxyl group.

| Reference Number | Total Volume of Reaction Mixture | Concentration of Dextran (mg./ml.) | Streptokinase Concentraton (mg./ml.) | Binding Time (hours) | Streptokinase Units Found per mg. of Product | Theoretical Streptokinase Units per mg. | Percent Nitrogen |
|---|---|---|---|---|---|---|---|
| 2200–13 | 25 | 40 | 3.3 | 63 | 7125 | 7560 | 1.13 |
| 2200–18 | 19 | 40 | 2.3 | 63 | 4900 | 5100 | 1.07 |
| 2200–37* | 12.5 | 80 | 4 | 17 | 3750 | 4100 | 1.18 |
| 2200–38* | 12.5 | 80 | 4 | 41 | 3150 | 4100 | 0.94 |
| 2200–46 | 25 | 150 | 2 | 17 | 1275 | 1450 | — |
| 2200–50 | 25 | 40 | 4 | 17 | 7750 | 9550 | — |
| 2465–14 | 25 | 40 | 1 | 17 | 1750 | 2156 | — |

*These particular runs were prepared from a single reaction mixture, and not by the separate dissolving of dextran and streptokinase in separate aliquots of buffer.

It can be seen that a very high percentage of the streptokinase used in this reaction mixture becomes chemically bonded to the dextran without loss in enzymic activity. In fact, with respect to run No. 2200-13, the specific activity of the matricized product expressed in units of streptokinase activity per microgram of chemically bound nitrogen appears to be actually higher than pure streptokinase.

EXAMPLE 3

About 7.8 mg. (1560 International Units) of L-asparaginase were dialyzed in and against 0.1 M sodium phosphate buffer at a pH of about 7.3. Following this, the asparaginase solution was diluted to 25 ml. in the same buffer.

One gram of the activated dextran of Example 1 was added to this solution, with stirring, and allowed to react at 5°C. for 41 hours. The resulting product was fractionated by a glass bead column, and the fractions yielding chemically bonded dextran-asparaginase were lyophilized to recover 1.19 grams of product having an enzyme activity of 0.717 International Units of asparaginase activity per mg. — about a 55% yield of bound enzyme.

6. The method of claim 5 in which said solvent is methanol.

7. The method of claim 6 in which from 1 to 3 parts by weight of sodium methoxide, 1 to 3 parts by weight of dextran, and 1 to 3 parts by weight of cyanogen bromide are present per 100 parts by weight of methanol.

8. The method of claim 5 in which a reaction temperature of from −20°C. to +10°C. is maintained.

9. The method of claim 1 in which from 10 to 80 parts by weight of said reaction product are reacted with 1 part by weight of an enzyme.

10. The method of claim 9 in which said enzyme is streptokinase.

11. The method of claim 9 in which said enzyme is L-asparaginase.

12. The method of claim 2 in which the lower alcohol is methanol.

13. The method of claim 12 in which said dissolved alkali is an alkali metal methoxide.

14. The method of claim 13 in which said cyanogen halide is cyanogen bromide.

15. The method of claim 14 in which said dissolved alkali is sodium methoxide.

* * * * *